United States Patent [19]
Itoh et al.

[11] Patent Number: 5,558,814
[45] Date of Patent: Sep. 24, 1996

[54] PHOSPHOR AND METHOD FOR PREPARING SAME

[75] Inventors: Shigeo Itoh; Yoshihisa Yonezawa; Hitoshi Toki, all of Mobara, Japan

[73] Assignees: Hiroshi Kukimoto, Kanagawa-ken; Futaba Denshi Kogyo Kabushiki Kaisha, Chiba-ken, both of Japan

[21] Appl. No.: 337,007

[22] Filed: Nov. 7, 1994

[30] Foreign Application Priority Data

Nov. 9, 1993 [JP] Japan ................................. 5-279709

[51] Int. Cl.$^6$ ........................................... C09K 11/62
[52] U.S. Cl. ........................ 252/301.4 R; 252/301.6 R
[58] Field of Search ..................... 252/301.6 R, 301.4 R

[56] References Cited

U.S. PATENT DOCUMENTS 4,170,018  10/1979  Runge ........................................ 357/17

OTHER PUBLICATIONS

Warren et al, "The effect of Mn concentration on the photoluminescence of ZnS:Mn", J. Phys. D:Appl. Phys., 16 (1983), 225–232. no month.

Warren et al., "A Study of the Luminescent and Electrical Characteristics of Films of ZnS doped with Mn", J. of Luminescence, 28, (1983), 147–162. no month.

*Primary Examiner*—Melissa Bonner
*Attorney, Agent, or Firm*—Fisher & Associates

[57] ABSTRACT

A phosphor capable of exhibiting luminescence with high efficiency by excitation due to impingement of electrons accelerated under an anode voltage of hundreds volts to about 2 kV thereon and a method for preparing the same are disclosed. Mn is ion-implanted in $ZnGa_2O_4$ which is a matrix crystal of the phosphor deposited on a substrate. Three kinds of implantation energy of 150 keV, 90 keV and 30 keV are selected and the ion implantation is effected three times in the order of the level of the implantation energy. A concentration of Mn is rendered substantially constant within a depth range between 100 angstrom and 1000 angstrom of a depth of 2000 angstrom or less in a luminous region of the phosphor. The ion implantation thus carried out three times permits the phosphor to exhibit increased luminous efficiency as compared with one-time ion implantation. The ion implantation permits Mn acting as a luminous center to be dispersed over a desired depth of the phosphor, resulting in lattice defects in the phosphor being widely distributed, leading to a decrease in the concentration of defects in the phosphor.

5 Claims, 5 Drawing Sheets

PHOSPHOR AND METHOD FOR PREPARING SAME

BACKGROUND OF THE INVENTION

This invention relates to a phosphor adapted to carry out luminescence by excitation due to impingement of electrons accelerated under an acceleration voltage of hundreds of volts to about 2 kV thereon and a method for preparing the same, and more particularly to a phosphor highly suitable in use for a luminous display section of each of various luminous elements such as, for example, a display device using a field emission cathode, a write head for a printer based on a principle of the fluorescent display device, a fluorescent display device of high luminance suitable for use in a display panel of the type mounted on a vehicle, and the like.

A conventional fluorescent display device is generally adapted to be driven under an anode voltage of a relatively low level such as 100 V or less. Driving of the fluorescent display device under such a low anode voltage causes a depth by which electrons accelerated under the low anode voltage enter into a phosphor to be as small as tens of angstroms, resulting in a region of the phosphor excited for luminescence being restricted to such a small depth.

Therefore, doping of an additive acting as a luminous center which has been conventionally carried out with respect to a phosphor excited for luminescence by electrons accelerated under such a low anode voltage is limited to a region of the phosphor which has such a reduced depth. Unfortunately, doping of the additive which is concentratedly carried out with respect to such a shallow region of the phosphor causes a crystal lattice defect to occur in the phosphor in such a manner that the number of lattice defects is proportional to the number of particles of the additive doped. FIG. 4 shows the relationship between a depth of doping of an additive or dopant in the phosphor and a concentration of each of the dopant and the lattice defect. As will be noted from FIG. 4, a distribution of concentration of the additive or dopant has a shape similar to that of the lattice defect, except that the latter is deviated toward a surface of the phosphor as compared with the former. This indicates that the lattice defect concentratedly occurs in a region of the phosphor in proximity to the surface thereof, thereby failing to permit the phosphor to exhibit sufficient luminance.

SUMMARY OF THE INVENTION

In view of the foregoing, the inventors have made efforts in developing a phosphor that is capable of being driven under an anode voltage as high as hundreds of volts to about 2 kV, unlike the above-described conventional phosphor driven under a low voltage. As a result, the inventors took notice of the fact that impingement of electrons on a surface of a phosphor while keeping electrons accelerated under an anode voltage of hundreds of volts to about 2 kV permits a depth of a region of the phosphor excited for luminescence to be as large as about 2500 angstroms from the surface as shown in FIG. 5. Thus, the inventors found that the conventional phosphor in which the lattice defect and additive are concentratedly distributed in the region thereof having such a small depth as described above from a surface thereof is not suitable for luminescence due to excitation under a low voltage.

Accordingly, it is an object of the present invention to provide a phosphor which is capable of exhibiting satisfactory luminescence with high efficiency due to impingement of electrons accelerated under an anode voltage of hundreds of volts up to about 2 kV thereon.

It is another object of the present invention to provide a method for preparing a phosphor which is capable of exhibiting satisfactory luminescence with high efficiency due to impingement of electrons accelerated under an anode voltage of hundreds of volts up to about 2 kV thereon.

In accordance with one aspect of the present invention, a phosphor is provided. The phosphor has an additive which contributes to luminescence of the phosphor dispersed in a uniform concentration in a region thereof having a depth of 2500 angstroms or less from a surface thereof.

In a preferred embodiment of the present invention, at least one kind of additive is dispersed in the region of the phosphor.

In accordance with another aspect of the present invention, a method for preparing a phosphor is provided. The method comprises the step of doping at least one kind of additive which contributes to the luminescence of the phosphor in a crystal matrix of the phosphor by ion implantation. The ion implantation is carried out a plurality of times while varying implantation energy in the order of the level thereof.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, wherein.

DETAILED DESCRIPTION OF THE PREFERRED EMBODIMENT

Now, the present invention will be described hereinafter with reference to an example thereof and the accompanying drawings.

An example of the present invention is featured in that ion implantation was carried out a plural number of times using ion implantation energy while varying the ion implantation energy in the order of the level thereof. Art additive contributing to luminescence of a phosphor includes an activator, a resistance reducing material and the like. In the example, Mn acting as an activator was ion-implanted in $ZnGa_2O_4$ which is a matrix crystal of the phosphor. The ion implantation is described in, for example, Japanese Patent Publication No. 17624/1978.

First, $ZnGa_2O_4$ which is the matrix crystal of the phosphor was pasted and then applied to a Si substrate by printing. Metal, glass, ceramic or the like may be used for the substrate in addition to Si. However, the matrix crystal of the phosphor is required to be arranged on an electrode arranged on the substrate which is made of a conductive film or the like. The application may be carried out by electrodeposition, spraying, photoresisting or the like.

Then, the substrate having $ZnGa_2O_4$ thus deposited thereon was then placed in an ion implantation apparatus. In the example, three levels of implantation energy of 150 keV, 90 keV and 30 keV were selected in order. The amount or number of Mn doped was set to be $2\times10^{16}/cm^2$ for every doping and $6\times10^{15}/cm^2$ in all. An ion current used during the ion implantation was set to be 1 to 100 μA.

Figure 2:
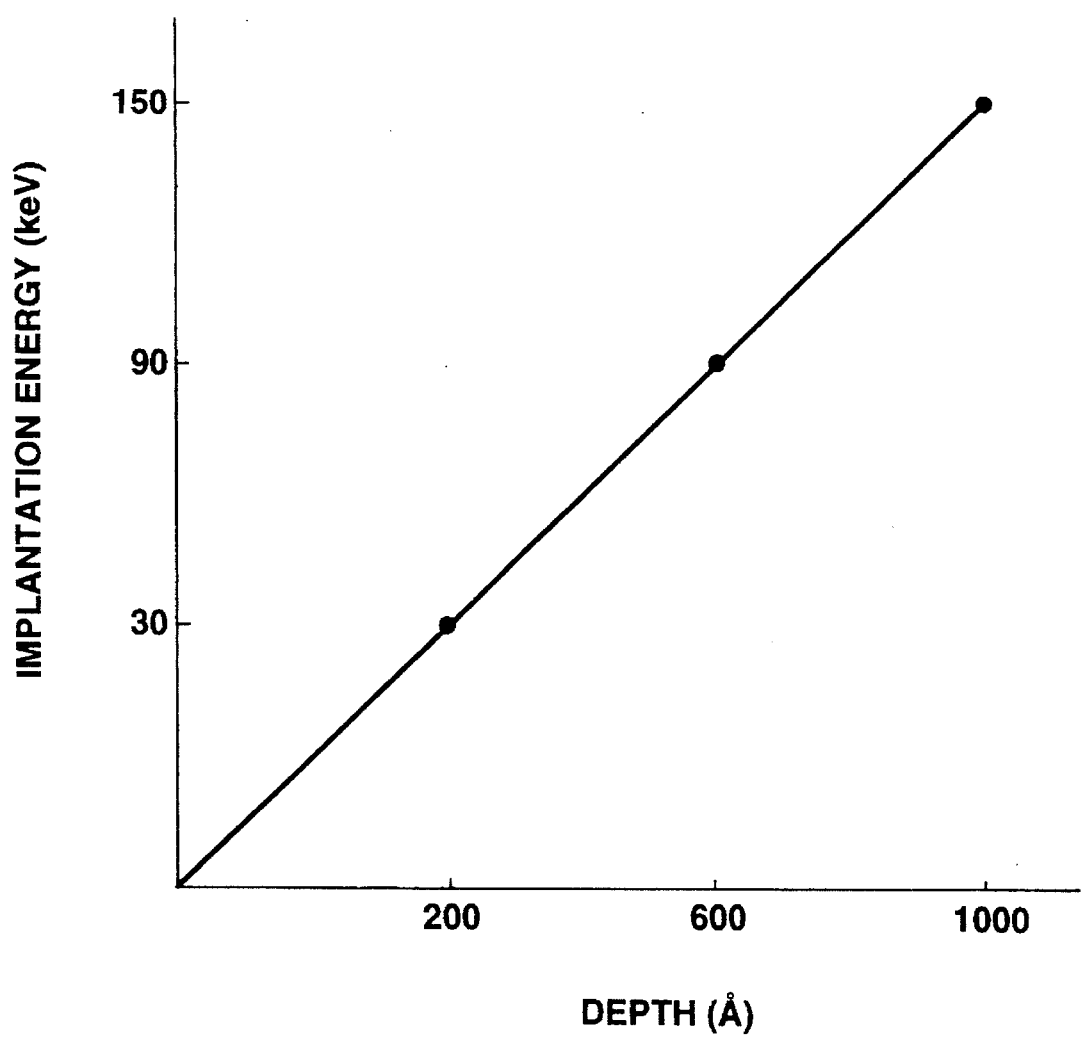
FIG. 2 is a graphical representation between ion implantation energy and a depth of implantation of ions in a phosphor which was obtained in an example of the present invention.

FIG. 2 shows a relationship between implantation energy and a depth of implantation of ions in the ion implantation of Mn in $ZnGa_2O_4$. It will be noted that the implantation depth is generally increased with an increase in implantation energy. However, i,t depends on a combination of matrix crystal of the phosphor and the impurity doped as well.

After the additive acting as a luminous center was thus doped in the phosphor by ion implantation, an annealing treatment was carried out in order to activate the luminous center and cure defects occurring during the ion implantation. In the example, the annealing took place using a lamp anneal apparatus. Also, the annealing was carried out at a temperature of 900° C. for 30 minutes in an Ar atmosphere. Alternatively, the annealing may be carried out using a laser apparatus, a furnace, an electronic beam apparatus or the like. The annealing may be preferably carried out in any other suitable atmosphere such as $N_2$, $O_2$ or the like. Such annealing conditions are varied depending on the matrix crystal, an impurity to be doped, implantation conditions or the like. Thus, the annealing conditions are preferably set depending on these factors.

Figure 1:
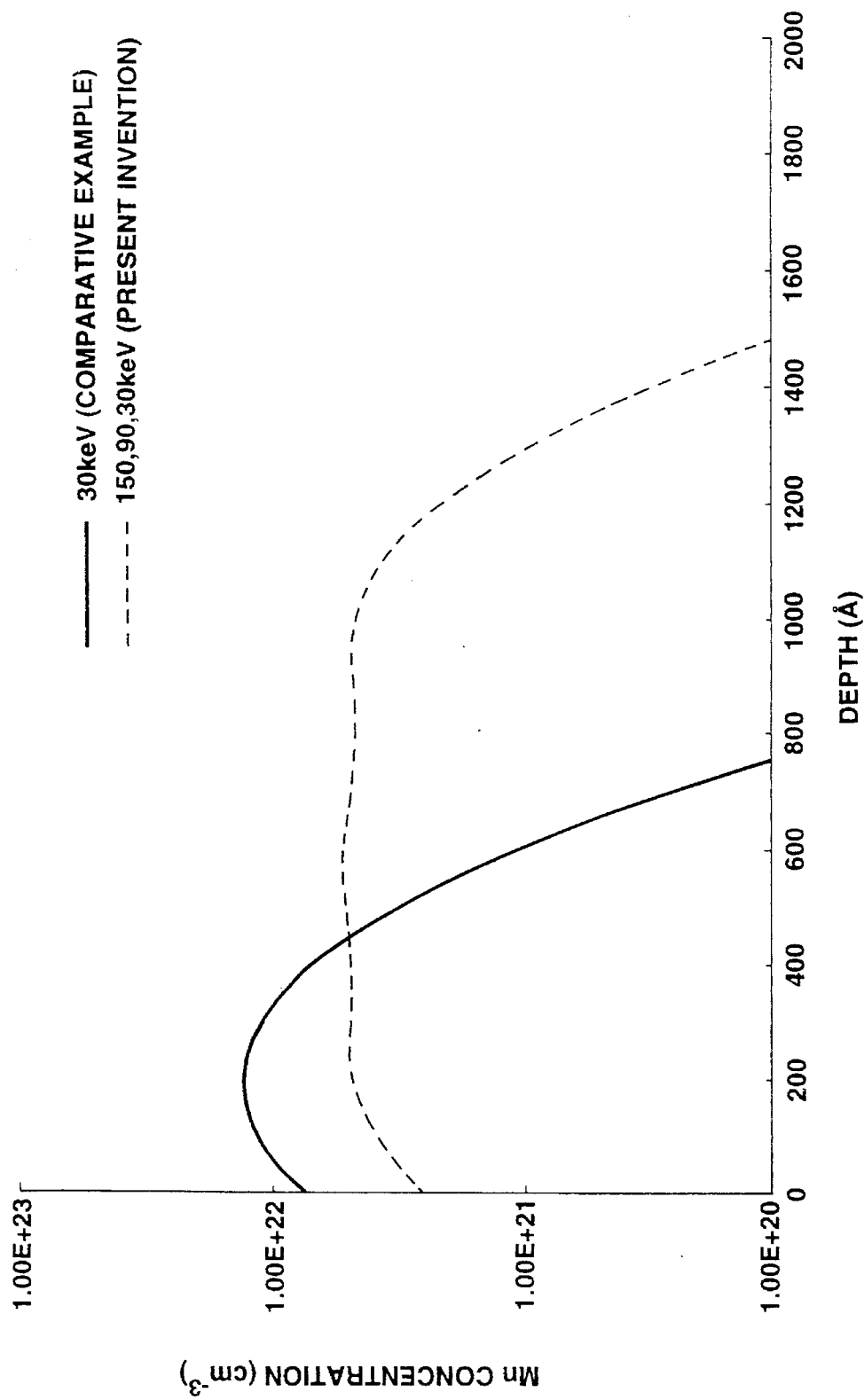
FIG. 1 is a graphical representation showing a relationship between a depth of a phosphor from a surface thereof and a concentration of Mn doped in the phosphor which was obtained in each of an example of the present invention and a comparative example.

FIG. 1 shows a distribution of Mn in $ZnGa_2O_4$ of the phosphor prepared as described above in the example. Also, in FIG. 1, a distribution of Mn ion-implanted in the same amount in $ZnGa_2O_4$ only at implantation energy of 30 keV is shown by a solid line as a comparative example. Ion implantation in the comparative example was executed under the same conditions as the example of the present invention. An annealing treatment in the comparative example was effected at a temperature of 900° C. for 30 minutes in an Ar atmosphere using the same annealing apparatus as the example of the present invention.

As will be noted from FIG. 1, in the example of the present invention, a concentration of Mn is gradually increased inwardly of a surface of the phosphor and then rendered substantially constant at a depth of about 200 angstroms to about 1000 angstroms from the surface. Then, Mn is gradually decreased from 1000 angstrom and then rendered zero at about 1400 angstroms.

Now, the phosphor of the example of the present invention will be compared in luminance with the phosphor of the comparative example.

Figure 3:
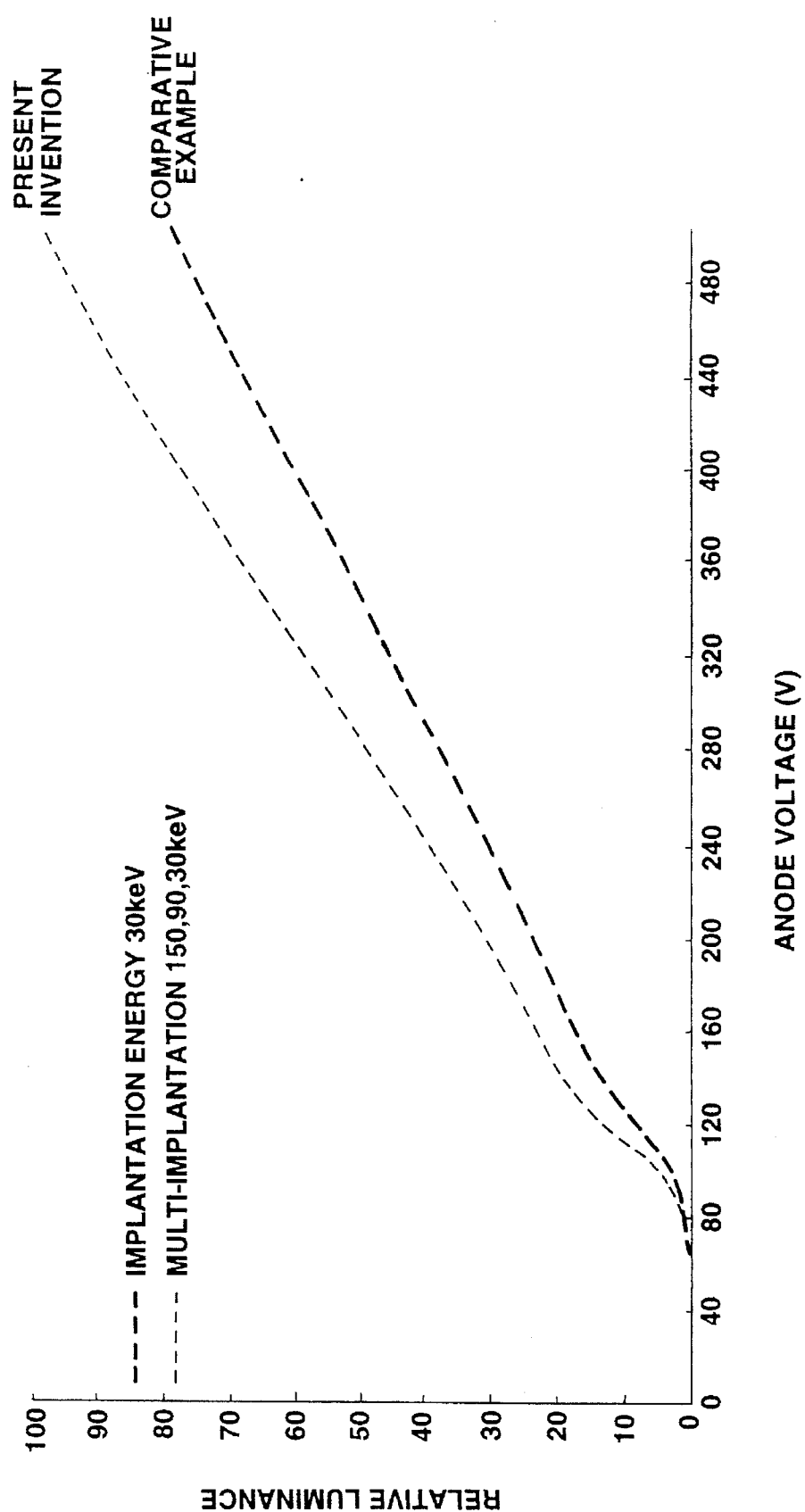
FIG. 3 is a graphical representation showing an anode voltage for accelerating electrons and relative luminance of a phosphor excited by impingement of the electrons on the phosphor which was obtained in each of an example of the present invention and a comparative example.
Figure 4:
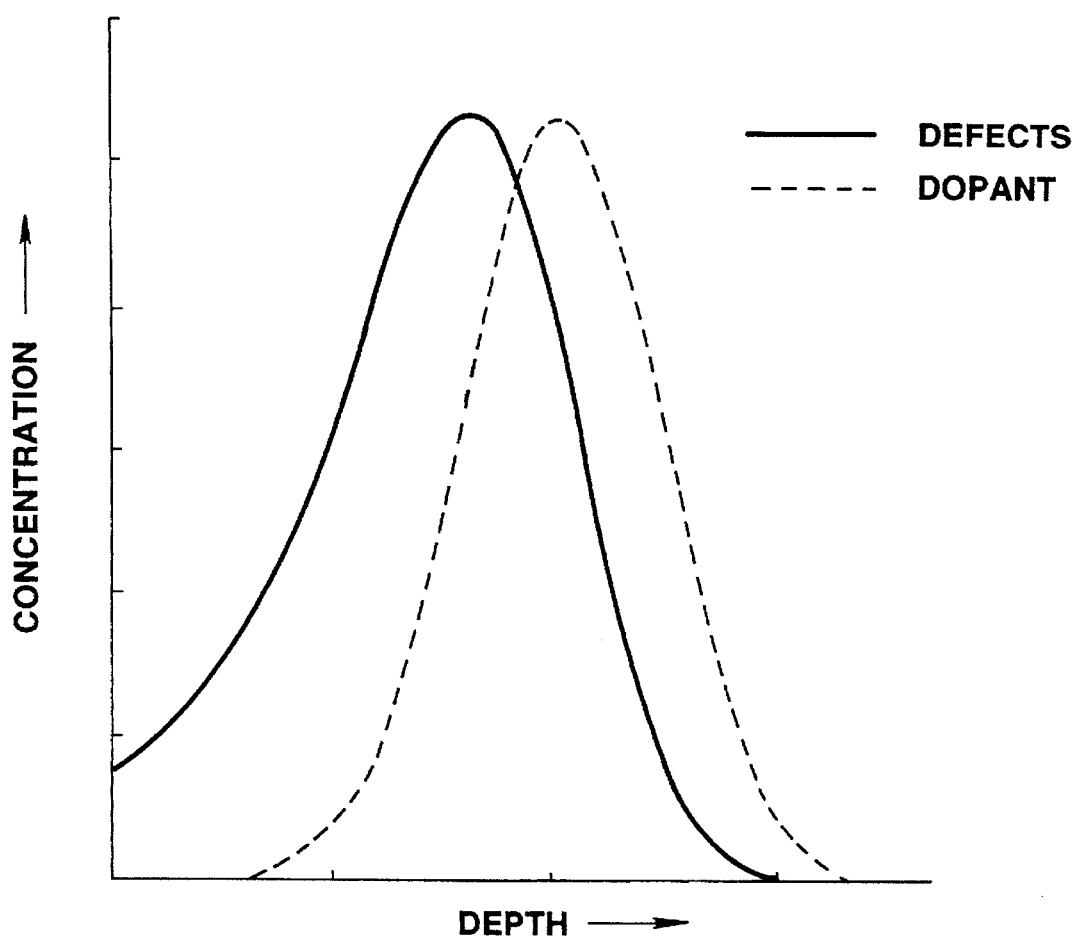
FIG. 4 is a graphical representation comparatively showing a distribution of a dopant concentratedly doped into a shallow region of a phosphor and a distribution of a lattice defect due to the doping.
Figure 5:
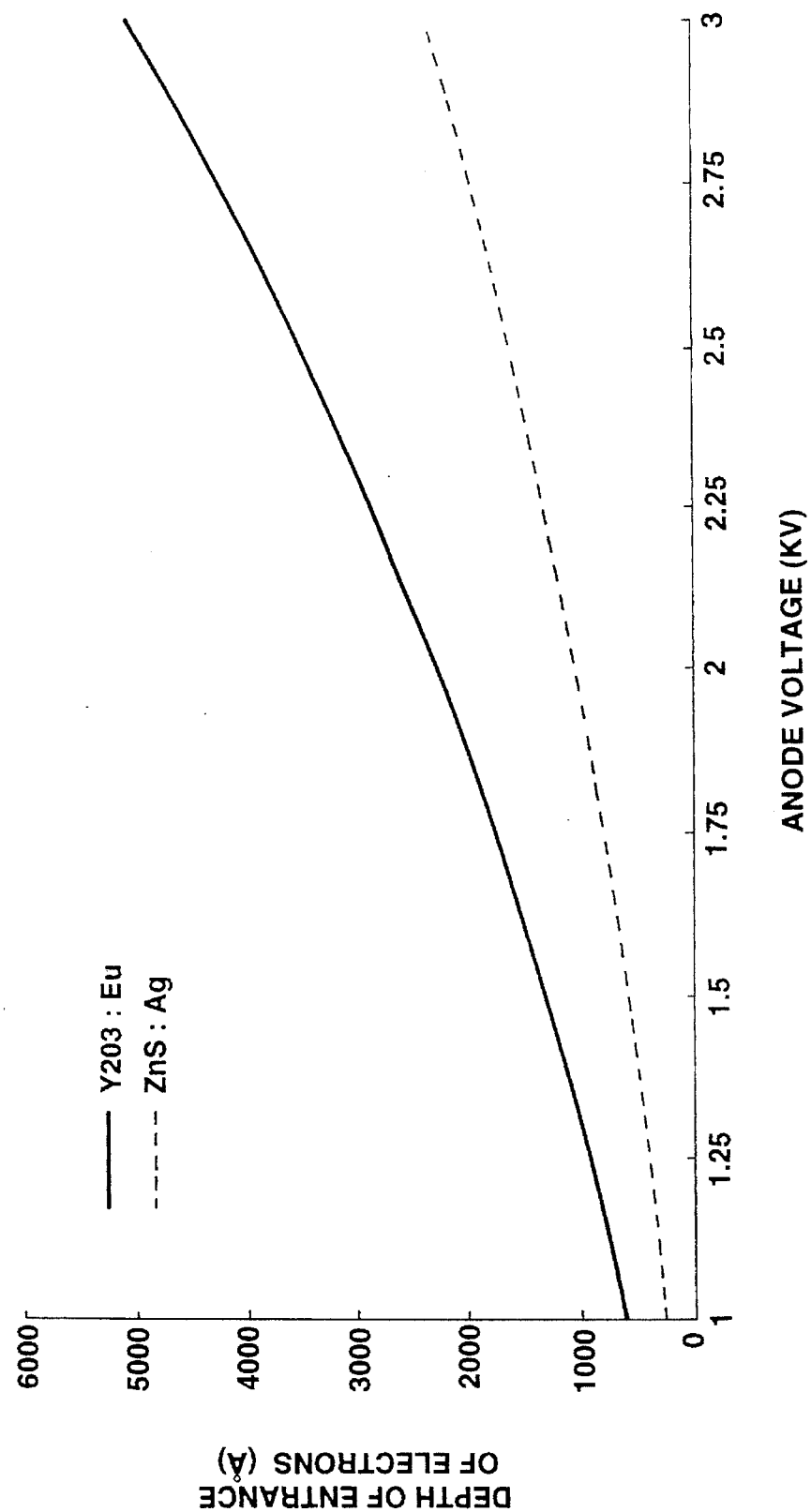
FIG. 5 is a graphical representation of the impingement of electrons on a surface of a phosphor.

FIG. 3 shows a relationship between an anode voltage for accelerating electrons and relative luminance of each of both phosphors obtained due to impingement of electrons thereon. As indicated by FIG. 3, the phosphor of the example of the present invention is increased in luminance at each anode voltage as compared with that of the comparative example.

The reason why the phosphor of the example of the present invention is thus superior in luminous characteristics to that of the comparative example would be that in the phosphor of the example of the present invention, Mn is uniformly distributed in a region of the phosphor up to 1000 angstroms in depth. A value of 1000 angstroms corresponds to a distance by which electrons accelerated by an anode voltage of a relatively high level such as hundreds of volts enter a phosphor or a depth of the luminous region of the phosphor of the example.

In the example of the present invention, a Mn concentration of $5\times10^{21}$ $cm^{-3}$ or more permits the phosphor to exhibit satisfactory luminous characteristics. In contrast, in the phosphor of the comparative example, Mn is concentratedly distributed in a relatively shallow region of the phosphor which has a depth of 0 to 500 angstroms and a concentration of Mn therein is highly increased as compared with that in the example of the present invention. This indicates that the region of the phosphor of the comparative example in which Mn is concentratedly distributed is increased in lattice defects correspondingly. Thus, the phosphor prepared by the conventional ion implantation fails to exhibit satisfactory luminous characteristics because it is substantially difficult to cure the lattice defects concentratedly accumulated in the narrow region of the phosphor by an annealing treatment.

On the other hand, the phosphor of the example of the present invention wherein the additive acting as the luminous center is distributed over a desired range of a sufficient depth from the surface of the phosphor, resulting in the concentration being rendered uniform permits the lattice defects to be widely distributed, thereby reducing the concentration of the lattice defects. In the example of the present invention, Mn is principally distributed over a wide range of 100 to 1000 angstroms.

Comparison between the example of the present invention and the comparative example indicates that both have the same amount of lattice defects. However, application of an ion implantation voltage a plurality of times while varying the level thereof in order in the example of the present invention permits Mn to be uniformly distributed over a luminous region of the phosphor, to thereby widely distribute the lattice defects. Effectively curing of the defects occur through an annealing treatment, so that the phosphor may exhibit increased luminous characteristics such as luminous efficiency, luminescence and the like.

As can be seen from the foregoing, the phosphor of the present invention is so constructed that the luminous center is evenly distributed in the luminous region of the phosphor. This prevents the lattice defects from being concentratedly distributed in a specific region of the phosphor, so that the phosphor may exhibit increased luminous characteristics such as luminous efficiency, luminance and the like.

Also, in the method of the present invention, the ion implantation is executed a plural number of times while varying a value of ion implantation energy in order, thereby permitting the luminous center to be evenly distributed in the luminous region of the phosphor while being uniformly dispersed therein. Thus, the present invention effectively prevents the lattice defects from being concentratedly distributed in a specific region of the phosphor, so that the phosphor may exhibit increased luminous characteristics such as luminous efficiency and the like due to excitation by electrons accelerated under a relatively high voltage.

While the present invention has been described with a certain degree of particularity with reference to the example and drawings, obvious modifications and variations are possible in light of the above teachings. It is therefore to be understood that within the scope of the appended claims, the invention may be practiced otherwise than as specifically described.

What is claimed is:

1. A phosphor for use in a luminescent display device consisting essentially of:

a matrix crystal of phosphor represented by a general formula $ZnGa_2O_4$, and an additive for contributing luminescence of the phosphor, said phosphor being excited for luminescence by electrons under an acceleration voltage of 100 V to 2 KV, wherein said additive is dispersed in a uniform concentration in a region of 2500 angstroms or less in depth from the surface of said phosphor.

2. A phosphor for use in a luminescent display device as defined in claim 1, wherein said additive is Mn.

3. A method for preparing a phosphor excited for luminescence by electron under an acceleration voltage of 100 V to 2 KV for use in a luminescent display device, said method comprising the steps of:

preparing a matrix crystal of phosphor represented by a general formula $ZnGa_2O_1$; and doping an additive for contributing luminescence of the phosphor by ion implantation, wherein said step of ion implantation is carried out a plurality of times while varying implantation energy in the order of a level of said implantation energy.

4. A method for preparing a phosphor excited for luminescence by electrons under an acceleration voltage of 100 V to 2 KV for use in a luminescent display device as defined in claim 3, wherein said additive is Mn.

5. A method for preparing a phosphor excited for luminescence by electrons under an acceleration voltage of 100 V to 2 KV for use in a luminescent display device as defined in claim 4, wherein Mn is implanted in $ZnGa_2O_4$ at 150 KeV, 90 KeV and 30 KeV, respectively.

* * * * *